United States Patent [19]

Lutton

[11] Patent Number: 5,161,848
[45] Date of Patent: Nov. 10, 1992

[54] REFRIGERATED VEHICLE BODY

[75] Inventor: Theodore A. Lutton, Wooster, Ohio

[73] Assignee: Kidron, Inc., Kidron, Ohio

[21] Appl. No.: 615,234

[22] Filed: Nov. 19, 1990

[51] Int. Cl.⁵ .............................................. B60P 3/20
[52] U.S. Cl. .................... 296/24.1; 296/181; 296/183; 296/208; 52/595
[58] Field of Search ............ 296/24.1, 181, 183, 296/191, 208, 39.3; 62/441, 447; 52/595

[56] References Cited

U.S. PATENT DOCUMENTS

| | | |
|---|---|---|
| 2,101,736 | 12/1937 | George . |
| 2,125,205 | 7/1938 | Snowden . |
| 2,168,018 | 8/1939 | Hartz . |
| 2,255,511 | 9/1941 | Muller . |
| 2,464,923 | 3/1949 | Davis . |
| 2,534,272 | 12/1950 | Kleist ............................ 62/441 X |
| 2,633,714 | 4/1953 | Wehby . |
| 2,677,244 | 5/1954 | Wehby . |
| 2,677,246 | 5/1954 | Wehby . |
| 2,881,688 | 4/1959 | Breen . |
| 2,896,271 | 7/1959 | Kloote et al. . |
| 3,057,284 | 10/1962 | Learmont . |
| 3,226,150 | 12/1965 | Menzer . |
| 3,287,925 | 11/1966 | Kane et al. ........................... 62/51 |
| 3,897,971 | 8/1975 | Evans ............................... 296/24.1 |
| 4,003,728 | 1/1977 | Rath .................................... 62/78 |
| 4,049,311 | 9/1977 | Dietrich et al. . |
| 4,080,906 | 3/1978 | Brown .......................... 296/24.1 X |
| 4,221,421 | 9/1980 | Bettker, Jr. et al. . |
| 4,236,366 | 12/1980 | Rijnders ........................... 52/595 X |
| 4,358,233 | 11/1982 | Morris et al. . |
| 4,360,553 | 11/1982 | Landheer ........................ 52/595 X |
| 4,459,821 | 7/1984 | Cabell et al. ...................... 62/239 |
| 4,505,126 | 3/1985 | Jones et al. ....................... 62/239 |
| 4,553,584 | 11/1985 | Bloomquist ........................ 165/30 |
| 4,639,031 | 1/1987 | Truckenbrodt . |
| 4,726,196 | 2/1988 | Zajic .................................. 62/239 |
| 4,880,342 | 11/1989 | Pradovic ........................... 410/121 |
| 4,887,437 | 12/1989 | Fenton et al. .................. 62/447 X |
| 5,054,295 | 10/1991 | Goulooze ........................... 62/239 |

FOREIGN PATENT DOCUMENTS

| | | |
|---|---|---|
| 25420 | 3/1981 | European Pat. Off. ............. 52/595 |
| 340743 | 11/1989 | European Pat. Off. .......... 296/24.1 |
| 222835 | 10/1986 | Japan ................................ 296/24.1 |
| 8802705 | 4/1988 | World Int. Prop. O. ......... 296/24.1 |

Primary Examiner—Russell D. Stormer
Assistant Examiner—Gary C. Hoge
Attorney, Agent, or Firm—Calfee, Halter & Griswold

[57] ABSTRACT

A vehicle body having a plurality of temperature controlled compartments is provided. The vehicle body has a longitudinally extending interior cavity including a front end, a rear end and two sides extending longitudinally between the front and rear ends. The interior of the vehicle body is partitioned into a pair of longitudinally extending compartments by removable panels, and each longitudinal compartment is selectively variable between a plurality of lengths by removable bulkheads. A first closed fluid circuit provides an air flow through one compartment to maintain such compartment substantially at a first controlled temperature designed for refrigerated goods, while a second closed fluid circuit, separate from the first closed fluid circuit, provides an air flow through the other compartment to maintain such compartment substantially at a second controlled temperature designed for frozen goods. An opening in the rear of the trailer allows loading and unloading of the goods from either compartment.

34 Claims, 6 Drawing Sheets

REFRIGERATED VEHICLE BODY

TECHNICAL FIELD

The present invention relates to a vehicle body having at least two compartments which provides for loading and unloading of frozen goods from one compartment and refrigerated goods from the other compartment. Additionally, the invention relates to a vehicle body partitioned into a pair of longitudinally extending compartments that have separately controllable temperatures and are selectively variable between a plurality of lengths.

BACKGROUND

Certain types of trailers are used for transporting goods from a manufacturing or storage facility to a number of distribution points, such as for example, restaurants, schools or other institutions. The trailers typically have doors in the rear and/or on the sides which allow for loading and unloading of the goods from the trailer. In particular, the goods are typically loaded into the rear of the trailer at the manufacturing or storage facility, and then selected portions are unloaded at each distribution point from either the rear or the side of the trailer, depending on the location of the goods in the trailer for the particular distribution point.

Some trailers are designed to transport both frozen and refrigerated goods. Consequently, trailers can include a refrigeration unit to maintain a reduced temperature in the interior cavity of the trailer. However, the refrigeration unit typically only provides a single controlled temperature, and it is therefor necessary to transport both the frozen and refrigerated goods at the same temperature. Typically, a compromise is made and a temperature is chosen somewhere between the refrigerated temperature and the frozen temperature. However, this compromise temperature is not particularly suited to maintain the quality and integrity of either the frozen or refrigerated goods over long periods of time.

Multi-temperature trailers have been designed which separate the frozen goods from the refrigerated goods during transportation. The multi-temperature trailers typically have a lateral bulkhead separating a front section from a rear section, and a refrigeration device for providing variable air flow for the two sections. For example, Wehby, U.S. Pat. No. 2,677,244, discloses a trailer having a series of moveable lateral bulkheads which separate the interior of the trailer into multi-temperature sections. A refrigeration device provides refrigerated air to the different sections through spaced outlets formed in air ducts. The outlets are selectively controllable to vary the air flow into the sections.

Providing lateral bulkheads in a trailer, however, can complicate the loading and unloading of the goods stored in the trailer. In particular, in the case of a trailer with only a rear door, practically all the goods in the rear section must be unloaded first before the goods in the front section are unloaded. If the sections are maintained at different temperatures, for example if the rear section is maintained at a refrigerated temperature, then practically all the refrigerated goods must be unloaded at each distribution point before any of the frozen goods can be unloaded. This manner of loading and unloading is inefficient if many distribution points are scheduled.

Trailers with multi-temperature sections have been designed with doors located on the side of the trailer to facilitate loading and unloading of the forward sections, as shown in Wehby, U.S. Pat. No. 2,633,714. A pull-out platform and step are typically located at the openings in the sides to facilitate using hand trucks or dollies to unload the cargo. However, it can be necessary to lift or push the cargo onto the platform, and then lift and carry the cargo off the ramp and load the cargo onto the handtruck or dolly on the ground. Such manual lifting can increase the risk of accident and can cause fatigue or physical injury. Moreover, having multiple door openings increases the difficulty of maintaining a reduced temperature in the interior of the trailer.

Other trailers have been designed that have selectively moveable panels forming a plurality of compartments which allow loading and unloading of the cargo from the rear of the trailer. For example, Bettker, Jr., et al. U.S. Patent No. 4,221,421, discloses independently moveable rigid panels which can be selectively arranged on mechanical linkages to divide the vehicle body into multiple compartments. The panels in Bettker may be located in a first position juxtaposed parallel to a wall, a second position parallel to and spaced from the wall, or in a third position arranged at an angle to the wall. A single refrigeration unit provides airflow through two ducts, wherein the first duct provides a general air outlet for one compartment, while the second duct provides selectively controllable air outlets for the remaining compartments.

While the foregoing references attempt to provide a method of dividing the interior of a trailer, they are not without drawbacks. For example, in Bettker, the dimensional variation of each compartment is limited to the extent of the movement of the panels on the mechanical linkages. Moreover, the Bettker and the Wehby references disclose a single source of air flow into the interior of the trailer, and although directed through multiple air ducts, the air flow tends to reach an equilibrium across the interior because of the lack of isolated compartments and closed fluid circuits to provide independent air flow to each compartment.

SUMMARY

The present invention provides a new and useful refrigerated vehicle body for a trailer or a truck having a plurality of longitudinally extending compartments. Each compartment in the vehicle body includes a closed fluid circuit which provides independent air flow to the compartment at a controllable temperature. Additionally, the invention provides for loading and unloading frozen or refrigerated goods to and from a respective compartment through an opening in the rear of the vehicle body.

According to one aspect of the present invention, the interior of the vehicle body is divided into a pair of longitudinally extending compartments by a partition, and each compartment is selectively variable between a plurality of lengths. The partition is formed by providing longitudinally extending channels along the ceiling and floor of the vehicle body. Removable panels having sealing structures are received within the channels to form a thermal and fluid barrier between the compartments.

The compartments may be varied between a plurality of lengths by removable lateral bulkheads. The bulkheads also have sealing structures and are selectively secured between a panel and the side of the vehicle body to vary the length of a compartment.

A first closed fluid circuit provides an air flow through one compartment at a temperature designed for refrigerated goods. A refrigeration unit mounted towards the front of the vehicle body provides refrigerant to a remote evaporator located within the refrigerated compartment. The remote evaporator is mounted in a suspended ceiling which extends along top of the vehicle body. The evaporator unit provides air flow through a first portion of the suspended ceiling to a supply air outlet located in the refrigerated compartment. The air circulates through the refrigerated compartment to cool the goods stored therein. A return air intake allows the air to be returned to the remote evaporator for recooling.

A second closed fluid circuit provides an air flow through the other compartment at a temperature designed for frozen goods. The refrigeration unit provides air flow through a second portion of the suspended ceiling to a supply air hatch located in the frozen compartment. The air circulates through the frozen compartment to cool the goods stored therein. A plurality of return air hatches are located in the suspended ceiling along the frozen compartment, and are selectively controllable to allow the air to be returned to the refrigeration unit for recooling.

The length of the frozen compartment can be selectively varied by the lateral bulkheads depending upon the quantity of frozen goods stored therein. For example, a lateral bulkhead can be located towards the front of the frozen compartment and secured between a panel and the side of the vehicle body to shorten the length of the compartment. The return air hatches in the frozen compartment can be selectively adjusted over the length of the compartment to maintain a closed fluid circuit wholly through the shortened frozen compartment.

Further features and advantages of the present invention will become apparent from the following detailed description and accompanying drawings which form a part of the specification.

DETAILED DESCRIPTION OF THE PREFERRED EMBODIMENTS

Figure 1:
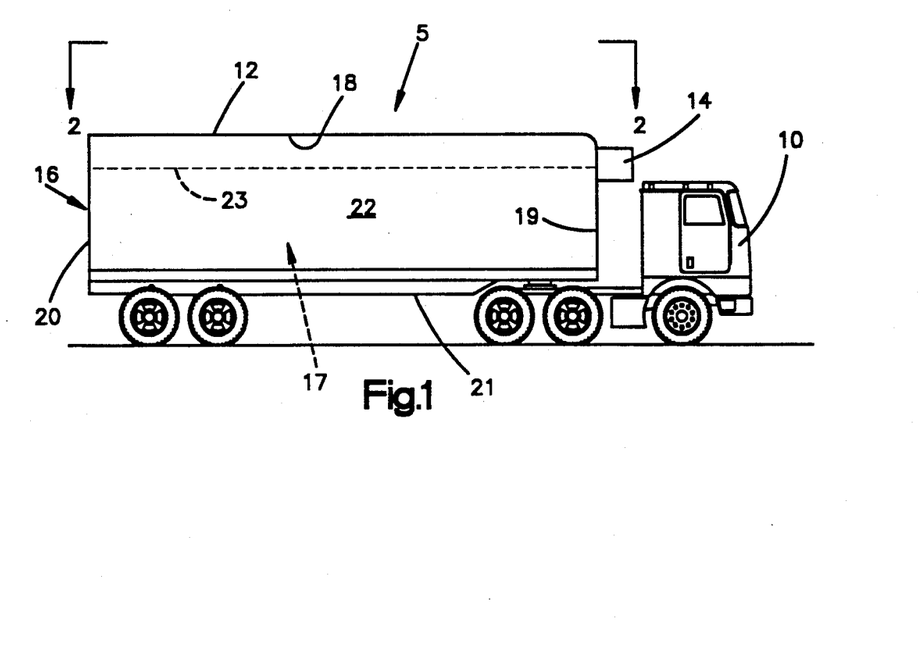
FIG. 1 is a side elevational view of a refrigerated vehicle constructed in accordance with the present invention.

Referring to the drawings, and initially to FIG. 1, a refrigerated vehicle, indicated generally at 5, such as a truck or trailer, is illustrated. The vehicle 5 comprises a cab 10 and a body 12, having a refrigeration unit 14 mounted thereon. Cargo, and in particular frozen and refrigerated goods, may be loaded and unloaded from an opening in the rear of the vehicle body, as indicated generally at 16. Although the preferred embodiment of this invention contemplates the use of a distribution trailer, it is also within the scope of this invention to use semi-trailers, full trailers, straight trucks, railroad cars, or other vehicles designed for transporting goods.

The vehicle body 12 includes an interior cavity, indicated generally at 17, having top 18, front end 19, rear end 20, bottom 21 and sides 22. A suspended ceiling 23 (shown in phantom) extends along the length of the interior of the vehicle body in spaced relation to the top and provides a substantially flat ceiling for the interior, as described herein in more detail.

Figure 2:
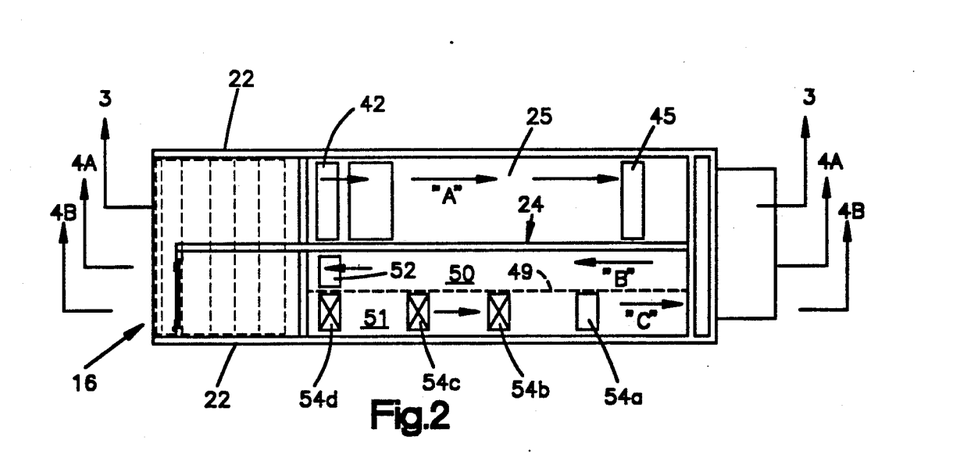
FIG. 2 is a top plan view of the refrigerated vehicle taken substantially along the plane described by the line 2—2 of FIG. 1, illustrating the frozen and refrigerated compartments.

As shown in FIG. 2, the interior is divided longitudinally by a partition, indicated generally at 24, into a first compartment 25 and a second compartment 26. Goods can be loaded or unloaded from either compartment through the opening 16 in the rear end of the vehicle body. The first compartment 25 is adapted to store goods at a first controlled temperature, for example, at a refrigerated temperature of about +35° F. to +50° F. The second compartment 26 is adapted to store goods at a second controlled temperature, for example at a frozen temperature of about 10° F. to −20° F.

Figure 3:
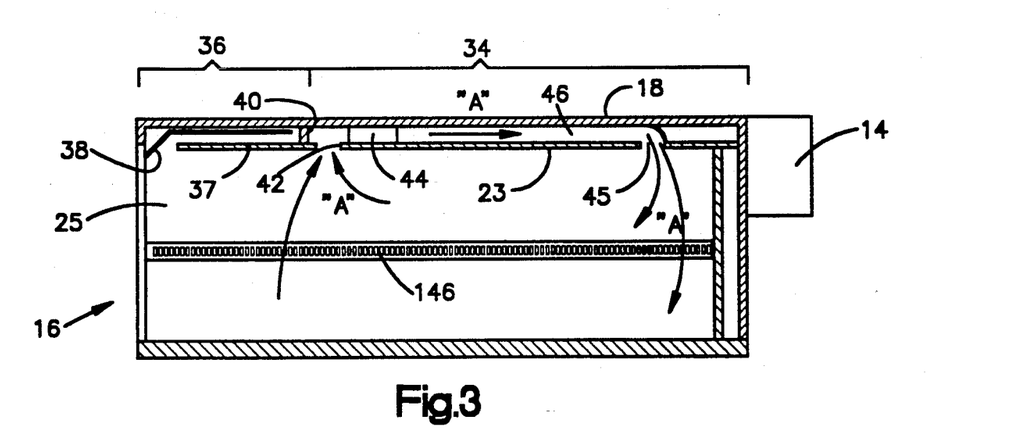
FIG. 3 is a sectional side view of the vehicle body taken substantially along the plane described by the line 3—3 of FIG. 2, illustrating the air flow through the refrigerated compartment.

As shown in FIG. 3, the portion of the suspended ceiling in the first, refrigerated compartment 25 includes a forward portion, indicated generally at 34, located towards the front end of the vehicle body, and a rearward portion, indicated generally at 36, located towards the rear end of the vehicle body. The rearward portion of the suspended ceiling includes a removable service panel 37 and a space for a conventional overhead door 38. The door 38 is adapted to be opened or closed to selectively provide access through the opening 16 to both compartments. The forward portion 34 of the suspended ceiling provides a plenum for the air flow for a first closed fluid circuit, as described herein in more detail. A barrier 40 thermally separates the forward portion 34 of the suspended ceiling from the rearward portion 36.

The forward portion 34 of the suspended ceiling includes a return air intake 42, a remote evaporator 44, and a supply air outlet 45. The return air intake 42 is located towards the rear of the forward portion 34, and extends substantially across the width of the refrigerated compartment. The supply air outlet 45 is located towards the front of the forward portion 34, and also extends substantially across the width of the refrigerated compartment. The remote evaporator 44 is mounted between the suspended ceiling 23 and the true top 18 of the vehicle body, and is substantially adjacent to the return air intake 42. The remote evaporator 44 includes refrigerant lines, compressors and fans (not shown) to provide conventional cooling and movement of the air through the return air intake 42 and the supply air outlet 45.

The refrigerant lines (not shown) from the remote evaporator run within the suspended ceiling of the vehicle body and are connected to the refrigeration unit 14 mounted on the front of the vehicle body. The refrigerant lines provide refrigerant from the refrigeration unit 14 to operate the remote evaporator 44. The remote evaporator and refrigeration unit are conventional in design, and are preferably manufactured by Thermo King Corporation, Models No. ECT REAR EVAPORATOR and Super II 30TC, respectively. The refrigeration unit can also be manufactured by the Carrier Corporation, Models No. REAR EVAPORATOR-CEILING, and THUNDERBIRD NDJ M2 or M3, respectively. The units cooperate to supply about 800-1200 cubic feet per minute (CFM) of cooled air to the refrigerated compartment for a vehicle body having an interior cavity of approximately 224 square feet.

The remote evaporator 44 is designed to receive air from the return air intake 42, cool the air, and discharge the cooled air through the supply air outlet 45. Specifically, as shown by the arrows "A" in FIGS. 2 and 3, the air flows up through the return air intake, through the remote evaporator 44, forward through a first air plenum 46 in the suspended ceiling, and out through the supply air outlet 45 at the front of the refrigerated compartment. The cooled air then circulates rearward through the compartment, and is again drawn into the return air intake 42 to complete a first closed fluid circuit. The first air plenum 46 includes conventional ceiling ducts (not shown) which can be formed by the support structure for the suspended ceiling and which fluidly connect the return air intake 42 and the supply air outlet 45.

Accordingly, an air flow is established which circulates air through substantially the entire refrigerated compartment 25 in a closed fluid circuit to cool the goods stored therein. The remote evaporator includes a conventional temperature control system (not shown), which uses a sensor and a thermostat to monitor and/or control the temperature within the compartment.

Figure 4A:
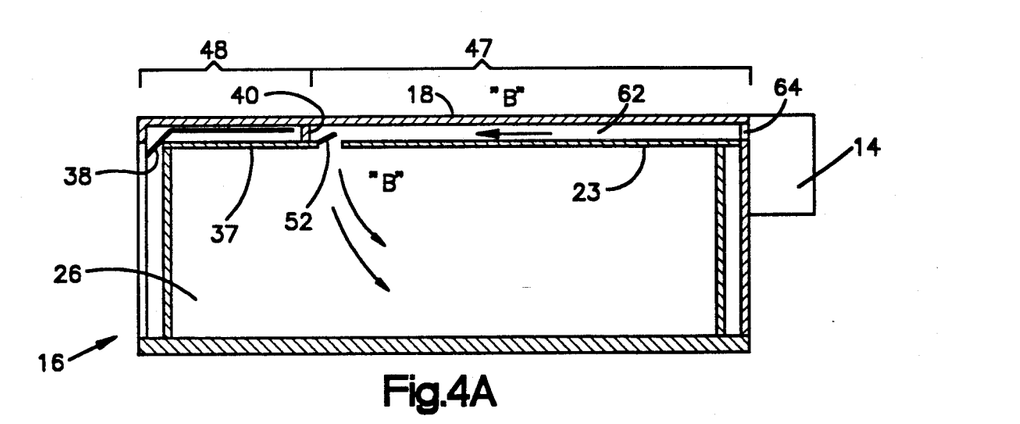
FIG. 4A is a sectional side view of the vehicle body constructed in accordance with the present invention taken substantially along the plane described by the line 4A—4A of FIG. 2, illustrating the air flow through the supply air hatch in the frozen compartment.
Figure 4B:
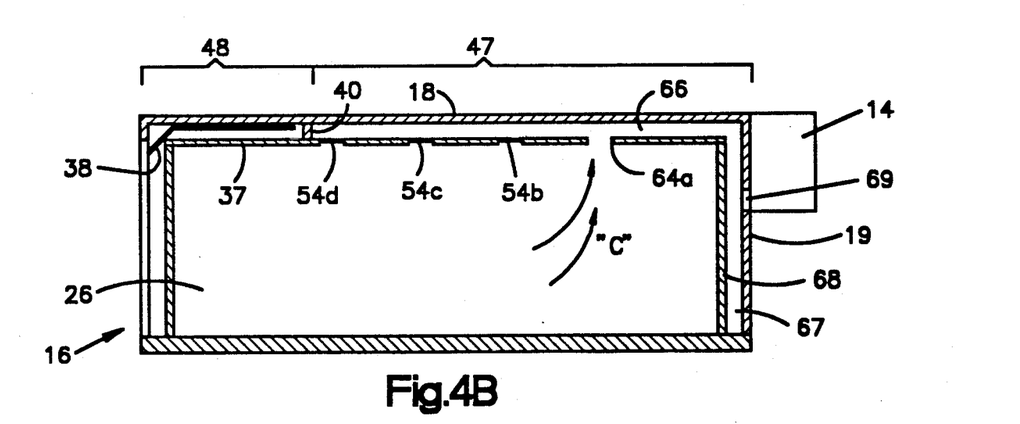
FIG. 4B is a sectional side view of the vehicle body constructed in accordance with the present invention taken substantially along the plane described by the line 4B-4B of FIG. 2, illustrating the air flow through the return air hatches in the frozen compartment.

An air flow is also provided to circulate air through substantially the entire frozen compartment 26 in a second closed fluid circuit. As shown in FIGS. 4A and 4B, the portion of the suspended ceiling 23 in the frozen compartment 26 also includes a forward portion, indicated generally at 47, and a rearward portion, indicated generally at 48. The rearward portion 48 of the suspended ceiling also includes a space for the service panel 37 and the overhead door 38. The forward portion 47 of the suspended ceiling establishes the second closed circuit air flow for the frozen compartment, as described herein in more detail. The barrier 40 thermally separates the forward portion from the rearward portion.

In the event panel-type doors are used on the vehicle body instead of an overhead-type door, the rearward portions 36 (FIG. 3) and 48 of the suspended ceiling would be an extension of the forward portions 34 (FIG. 3) and 47 of the suspended ceiling, and the suspended ceiling would extend to the end of the vehicle body. However, all other design characteristics would not be effected.

Referring again to FIG. 2, the forward portion of the suspended ceiling in the frozen compartment is divided longitudinally by a barrier 49 into a first half 50 and a second half 51. As shown in FIG. 4A, the first half 50 of the frozen compartment preferably includes a single supply air hatch 52 mounted in the suspended ceiling 23 towards the rear of the forward portion 47. The supply air hatch 52 is connected by a second air plenum 62 through the suspended ceiling to a supply air discharge opening 64 in the refrigeration unit 14. The air plenum 62 includes conventional ceiling ducts (not shown) which can be formed by the support structure for the suspended ceiling and which fluidly connect the air discharge opening 64 with the return air hatch 52.

Additionally, as shown in FIG. 4B, a plurality of return air hatches 54a-54d, are mounted in spaced relationship along the second half 51 (FIG. 2) of the frozen compartment. Although the preferred form of the invention contemplates using four return air hatches, it is within the scope of the invention to increase or decrease the number of return air hatches. The return air hatches are connected by a third air plenum 66 through the suspended ceiling to an air cavity 67. A laterally extending rigid bulkhead 68 is connected along the sides and bottom to the vehicle body, which, together with the front end 19, defines the air cavity 67. Air flows through the cavity 67 into at least one opening 69 to the refrigeration unit 14.

The air plenum 66 also includes a conventional duct (not shown) connecting the air cavity 67 with the return air hatches 54a-54d. The supply air hatch 52 (FIG. 4A) and the return air hatches 54a-54d are selectively controllable and can be manually opened or closed to vary the air flowing therethrough, as described herein in more detail.

The refrigeration unit 14 provides cooled air rearwardly through the plenum 62 in the first half of the suspended ceiling to the supply air hatch 52 in the frozen compartment, as shown generally by the arrows "B" in FIGS. 2 and 4A. The air circulates through the compartment, and is drawn back through an open return air hatch, for example hatch 54a, in the second half of the suspended ceiling, as shown generally by the arrows "C" in FIGS. 2 and 4B, and into the refrigeration unit 14 to be recooled. The refrigeration unit preferably supplies about 1800-2200 CFM of air to the frozen compartment for a vehicle body having an interior of approximately 224 square feet. The refrigeration unit includes a conventional temperature control system (not shown) which uses a sensor and a thermostat to monitor and/or control the temperature within the compartment.

Figure 5:
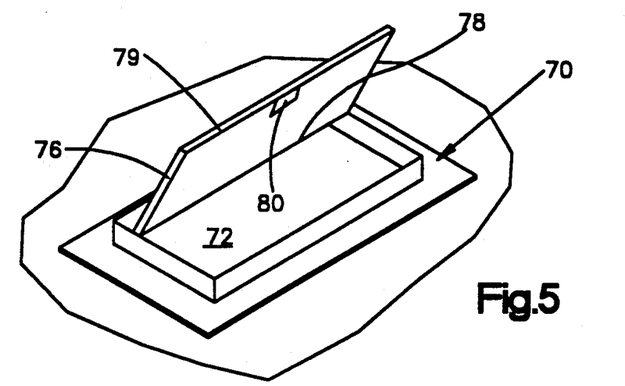
FIG. 5 is a perspective view of a hatch constructed in accordance with the present invention.

As shown in FIG. 5, each of the supply air hatches and return air hatches comprise a rigid frame, indicated generally at 70, formed from metal or fiberglass members and die-cut or formed to create an opening 72 therein. The frame 70 is adapted to be mounted within the suspended ceiling with rivets or other conventional fasteners. Each hatch includes a selectively moveable door 76 attached with a hinge 78 on one side to the frame. The hinge 78 allows the door to be manually opened or closed to selectively allow air to flow through the hatch. The door side 79 is adapted to engage the true top 18 (FIGS. 4A, 4B) of the vehicle body to form a baffle to direct air upwardly or downwardly through the hatch. Further, a latch 80 may be included on the door to engage and seal the frame when the door is closed.

The width of the hatch, including the frame 70, is approximately half the distance across the frozen compartment. As shown most clearly in FIG. 2, the supply air hatch 52 in the frozen compartment extends across approximately the entire width of the first half 50 of the suspended ceiling. Similarly, the return air hatches 54a-54d in the frozen compartment also extend across approximately the entire width of the second half 51 of the suspended ceiling.

Figure 6:
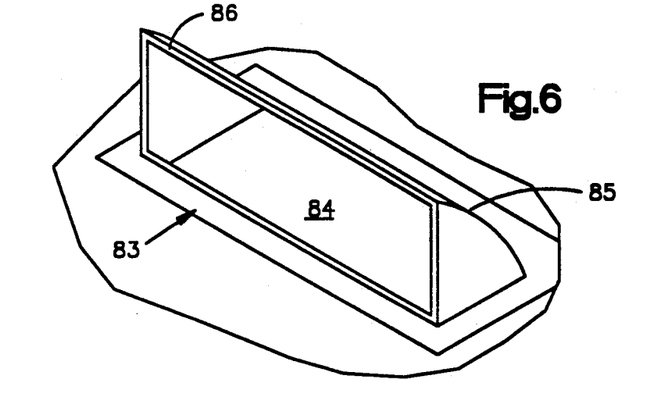
FIG. 6 is a perspective view of an air flow opening constructed in accordance with the present invention.

The supply air intake and the return air outlet in the refrigerated compartment also comprise a rigid frame, indicated generally at 83 in FIG. 6, formed from metal or fiberglass and die-cut or formed to create an opening 84 therein. The frame 83 is adapted to be mounted within the suspended ceiling by rivets or other conventional fasteners. Each inlet or outlet also includes a directional member 85 formed integrally with the frame, the top side 86 of which engages the true top 18 (FIG. 3) of the vehicle body. The directional member 85 forms a baffle to direct air upwardly or downwardly through the inlet or outlet. Each air inlet and outlet extends approximately the entire distance across the width of the refrigerated compartment, as shown most clearly in FIG. 2.

The vehicle body is divided into a pair of longitudinally extending compartments by the partition 24. The partition comprises a plurality of insulated removable panels, one of which is indicated at 95 in FIG. 7. The panels are adapted to provide a longitudinally extending thermal and fluid barrier to create isolated compartments for the transportation of frozen and refrigerated goods. The panels 95 are adapted to be mounted along the ceiling 23 and the floor 96 of the vehicle body, as described herein in more detail.

Figure 8:
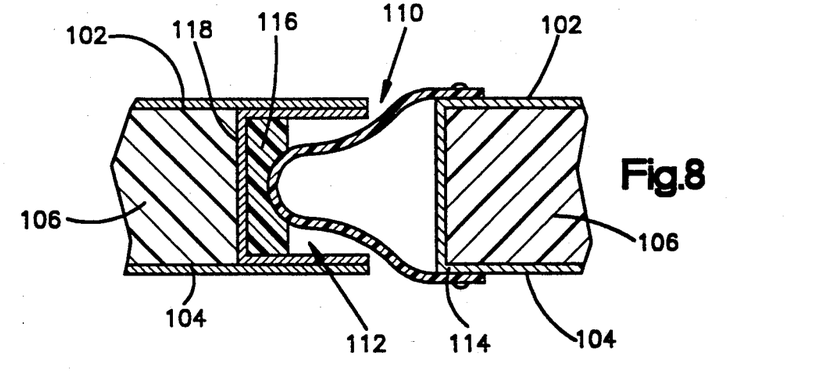
FIG. 8 is a top sectional view of the sealing structure of a partition panel, taken substantially along the plane described by the line 8—8 of FIG. 7.

Each panel 95 includes a top portion, indicated generally at 97, a bottom portion, indicated generally at 98, and two sides 99, 100. The width of each panel is preferably about 34 inches, while the height of each panel is dependent upon the height of the vehicle body. As shown in FIG. 8, each panel is formed from two opposing sheets of lightweight flexible material, 102, 104, for example fiberglass, which define a cavity 106 therebetween. The cavity 106 is preferably about 2 inches wide and is filled with conventional insulating material to provide a lightweight thermal and fluid barrier.

The two ends of the panel include a sealing structure. The sealing structure includes a tongue, indicated generally at 110, and a groove, indicated generally at 112. The tongue 110 is located along one end of each panel and is formed from rigid material 114 such as aluminum, folded longitudinally along the side of the panel. Additional insulating material (not shown) can also be included within the tongue. The tongue is attached to the two sheets 102, 104 with conventional fasteners, such as rivets, nuts and bolts and/or adhesives.

The groove 112 is located along the other end of each panel and is formed by the ends of the fiberglass sheets extending a short distance beyond the insulating material. A U-shaped, fiberglass member 118 can also be secured therein. Yieldable material 116, for example foam rubber, is disposed in the bottom of the U-shaped member 118. The groove on one panel is adapted to receive the tongue from an adjacent panel, as illustrated in FIG. 8, to thereby form a thermal and fluid seal therebetween. The foam rubber in the groove absorbs the inserted tongue to improve the insulating properties of the seal.

Figure 9:
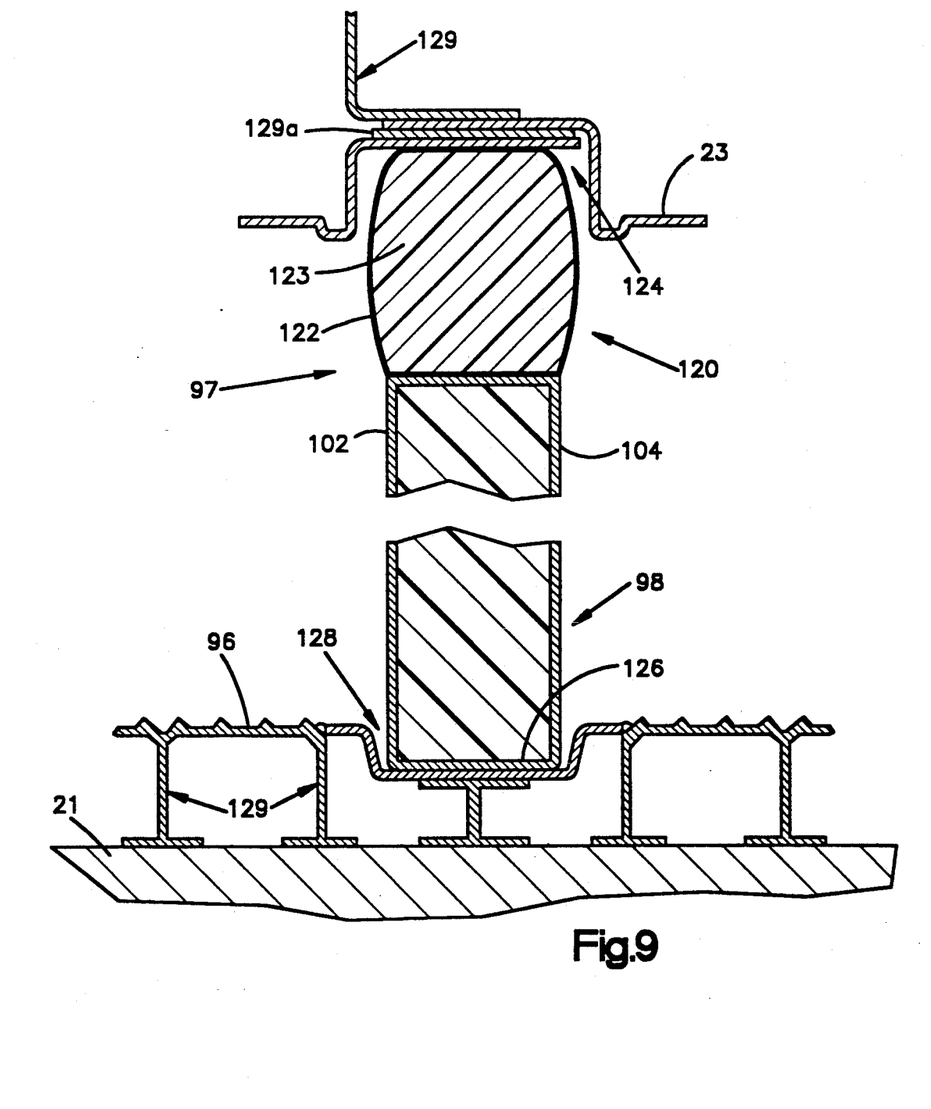
FIG. 9 is a cross-sectional detail view of a partition panel interconnection with the ceiling channel and the bottom channel.

The top portion 97 of the panel also includes a sealing structure, shown generally at 120 in FIG. 9. The sealing structure on the top of the panel is formed from conventional flexible material 122 folded over the fiberglass sheets 102, 104 and secured thereto with conventional fasteners, such as rivets or nuts and bolts. Yieldable material 123, such as foam rubber, is disposed between the flexible material and the top of the sheets to improve the insulating properties of the sealing structure.

The top portion 97 of the panel is adapted to be received in a first longitudinally extending channel 124 formed along the length of the suspended ceiling 23. The bottom portion 98 of the panel can include an additional sheet of fiberglass 126 and is adapted to be received in a second longitudinally extending channel, indicated generally at 128, formed along the length of the floor 96. The first channel 124 is preferably about 1⅛ inches deep, while the second channel 128 is preferably about ⅜ inch deep. The two channels 124, 128 extend longitudinally along the length of the vehicle body to divide the interior of the vehicle body substantially in half. Conventional supporting structure 129 is included to support the suspended ceiling 23 below the top 18 (FIG. 1) of the vehicle body, and to support the floor 96 above the bottom 21 of the vehicle body. Additionally, thermal insulation 129a can be included between the supporting structure 129 and the first channel 124 in the suspended ceiling 23, and additional insulation (not shown) can be included between the supporting structure 129 and the second channel 128 in the floor.

Each panel 95 is adapted to be selectively mounted in the two channels by initially inserting and lifting the top portion 96 of each panel into the ceiling channel 124. The bottom portion 98 of the panel is then moved into the bottom channel 128 and lowered so that the panel is located substantially horizontally between the channels. To remove a panel, the procedure is reversed. Conventional handles 130 (FIG. 7) are included on the surfaces of the panels to facilitate attachment or removal of the panels from the channels.

Figure 7:
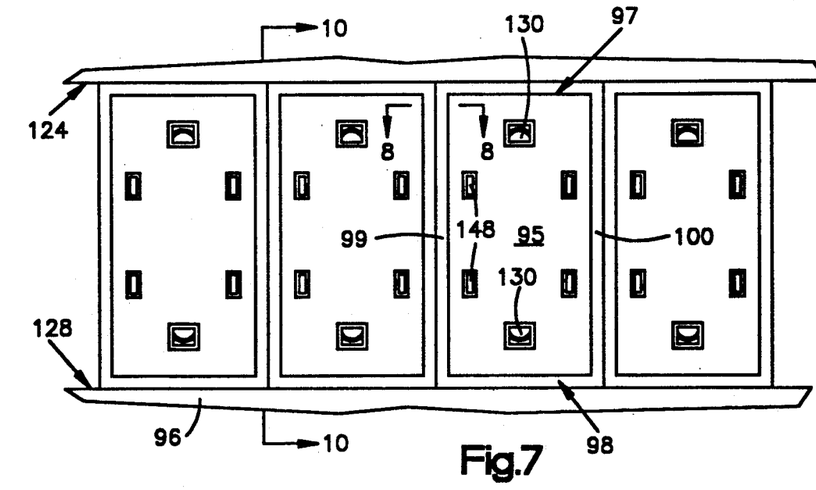
FIG. 7 is a side view of a plurality partition panels constructed in accordance with the present invention.

A plurality of the panels are mounted within the two channels in adjacent edgewise relationship longitudinally along the compartment, as illustrated in FIG. 7. The sealing structure on the sides and top of each panel cooperate with the sealing structure on an adjacent panel and with the ceiling channel to provide a thermal and fluid barrier between the two compartments. Accordingly, the insulated panels form a longitudinally extending partition along the length of the interior of the vehicle body that separates the refrigerated compartment from the frozen compartment.

The isolated compartments allow storage of refrigerated goods in one compartment and frozen goods in the other compartment. In particular, as shown in FIG. 2, the supply air outlet 42 and the return air inlet 42 in the refrigerated compartment provide a first closed fluid circuit air flow through the refrigerated compartment to store goods at a refrigerated temperature, while the supply air hatch 52 and the return air hatches 54a-54d in the frozen compartment provide a second closed circuit air flow through the frozen compartment to store goods at a frozen temperature. The partition 24 provides a thermal and fluid barrier between the refrigerated compartment and the frozen compartment to isolate the compartments and prevent air flow therebetween. Accordingly, frozen goods and refrigerated goods can be stored with appropriate temperature control, thereby assuring the quality and integrity of the goods.

When not in use, the partition panels can be removed from the two channels and stored along the side of the interior of the vehicle body. For this purpose, a longitudinally extending channel 131 is provided along the ceiling of the vehicle body adjacent to one side. The channel is adapted to receive the top portion of the panels to secure the panels along the side of the vehicle body.

Figure 10:
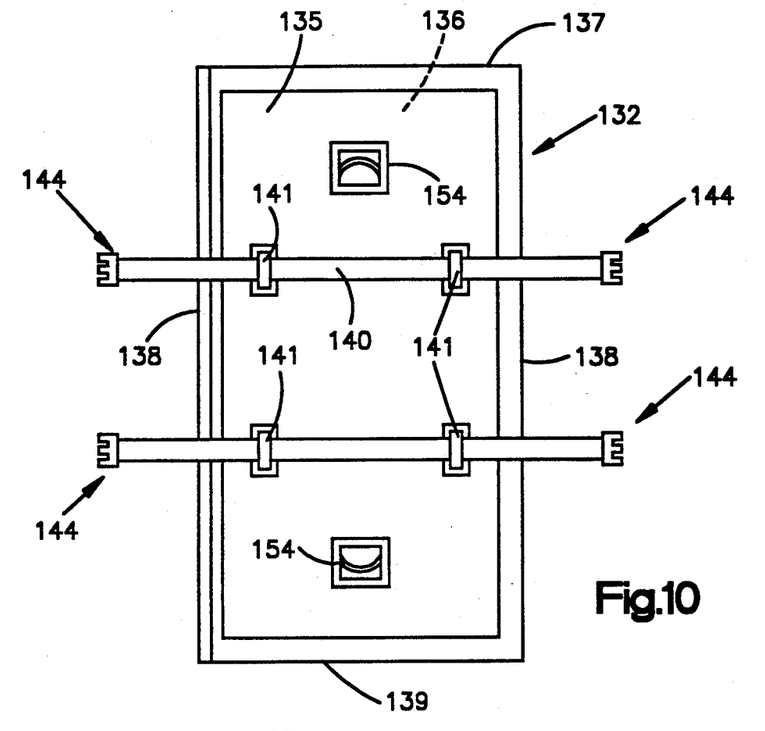
FIG. 10 is a front view of a bulkhead constructed in accordance with the present invention.

Additionally, the length of the longitudinally extending compartments 25, 26 can be varied using lateral bulkheads, one of which is illustrated generally at 132 in FIG. 10. The length of a compartment, for example the frozen compartment, can be varied by mounting a bulkhead 132 substantially perpendicular to the sides of the vehicle body at a selected location along the length of the frozen compartment, as described herein in more detail.

The lateral bulkhead 132 is similar in design to the partition panels, and comprises a first sheet 135 and second sheet 136 of rigid material having insulation disposed therebetween. The top 137, sides 138, and bottom 139 of the bulkhead also include a sealing structure such as for example, foam rubber with a flexible fabric cover. The fabric cover can be attached to the bulkhead with conventional fasteners, such as rivets or nuts and bolts.

The dimensions of the bulkhead 132 are such that bulkhead fits securely between the ceiling and floor of the compartment, and between one side of the vehicle body and a panel partition. When positioned within the vehicle body, the bulkhead provides a thermal and fluid barrier between two areas of a compartment.

Each bulkhead includes a series of loops 141 attached to one side of the bulkhead. Straps 140 extend through loops 141 and are adapted to secure the bulkhead within the vehicle body. Each strap 140 has two ends, and each strap end has a cargo control hook attached thereto, as shown generally at 144. The cargo control hooks are conventional in design and are preferably manufactured by Kinnedyne Corporation under the trademark E-HOOK. The cargo control hooks are adapted to be selectively received in cargo control tracks, such as for example tracks manufactured by Kinnedyne Corporation under the trademark E-TRACK. The cargo control tracks 146 extend along the sides of the vehicle body, as shown at 146 in FIG. 3, and along the surface of the partition panels 95 (as shown at 148 in FIG. 7).

The straps 140 can be tightened down to secure the bulkhead between two opposing sets of cargo control tracks. For example, the straps can be tightened down to secure the bulkhead between a panel and one side of the vehicle body. The cargo control tracks are mounted along the length of the vehicle body. Accordingly, the bulkhead can be secured at a variety of locations along the interior of the body. Further, additional lateral bulkheads can be positioned at selected locations along each compartment to vary the length of the compartment and create additional storage areas, depending on the quantity of frozen or refrigerated goods to be stored or transported therein.

Each bulkhead 132 can be removed when not in use by using conventional handles 154 mounted on the front and rear surfaces. The bulkheads can also be mounted and secured adjacent one side of the vehicle body using the cargo control hooks and cargo control tracks previously mentioned.

Figure 11:
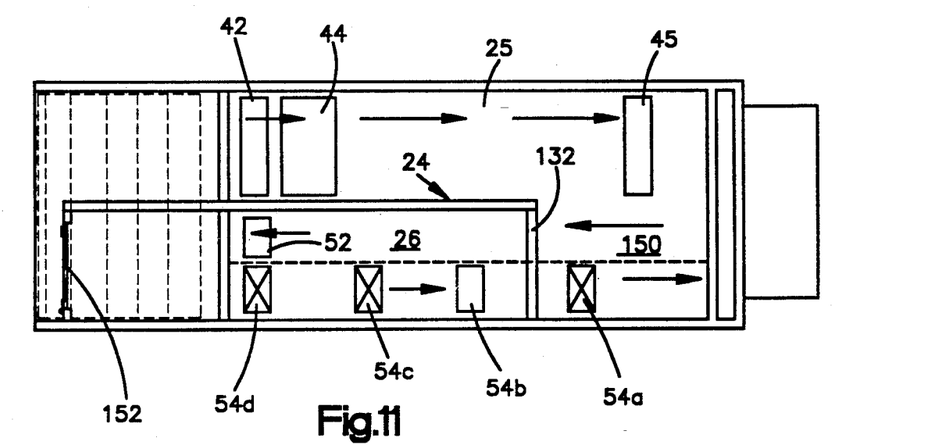
FIG. 11 is a top plan view of the refrigerated vehicle of FIG. illustrating the refrigerated compartment and a shortened frozen compartment.

In addition to the moveable bulkheads, the supply air hatches 54a-54d can be selectively controlled to provide an air flow within the length of the frozen compartment. For example, if a bulkhead is used to shorten the frozen compartment, the hatches can be selectively adjusted to maintain a closed circuit fluid flow wholly within the shortened compartment. In particular, if the bulkhead 132 is inserted towards the front of the frozen compartment 26, but rearward of the first supply air hatch 54a as illustrated in FIG. 11, the first supply air hatch 54a can be closed to create a storage area, indicated generally at 150, and to reduce the size of frozen compartment. The second supply air hatch 54b, located within the shortened frozen compartment, can be opened to maintain a closed fluid circuit wholly within the shortened frozen compartment. In this way, the length of the frozen compartment can be selectively varied by the bulkheads and the supply air hatches can be selectively controlled to provide a closed fluid circuit within the length of the frozen compartment.

Additionally, the partition panels that are separating the refrigerated compartment 25 from the storage area 150 of the frozen compartment can be removed to provide additional storage space for refrigerated goods, as illustrated in FIG. 11. It has been determined that the air flow from the remote evaporator 44 is sufficient to provide cooled air for both the refrigerated compartment 24 and the storage area 150. If necessary, a conventional door (not shown) can be provided in the side of the vehicle body to provide access to the unused area for loading and unloading refrigerated goods, but preferably, the goods in the storage area are also loaded and unloaded from the rear of the vehicle body.

In the preferred form of the invention, a lateral bulkhead, for example as shown at 152, is mounted and secured towards the rear of the frozen compartment to prevent warm air from flowing into the frozen compartment during loading and unloading of goods from the refrigerated compartment. The bulkhead 152 is secured in the selected location using the above-mentioned cargo control hooks and cargo control tracks.

Figure 12:
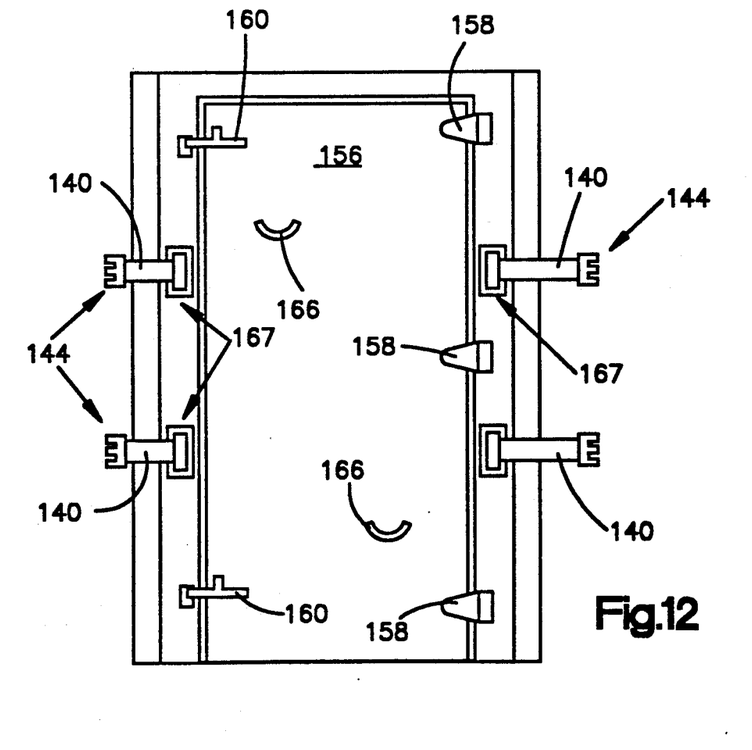
FIG. 12 is a front view of a bulkhead constructed in accordance with an additional embodiment of the invention.

Moreover, as shown in FIG. 12, the lateral bulkhead may also include a conventional door 156 formed therein, which includes hinges 158, locks 160, and handles 166, and which thereby allows selected access to the frozen compartment. In this embodiment, straps 140 can be attached directly to the bulkhead, for example as shown generally at 167.

Accordingly, the present invention provides a multi-temperature vehicle body which allows loading and unloading of refrigerated as well as frozen goods from the rear of the vehicle body. Additionally, the invention includes closed fluid circuits which provide air flow to one longitudinally extending compartment at a first controlled temperature, and air flow to another longitudinally extending compartment at a second controlled temperature, different from the first temperature. Moreover, the present invention provides for selectively varying the length of the compartments and the corresponding fluid flow within the compartments.

Nevertheless, the present invention anticipates variations of the embodiments discussed herein. For example, it is within the scope of this invention to include plural bulkheads along the length of either or both the frozen and refrigerated compartments to create additional storage areas, and to provide additional controllable closed circuit air flows therein. To this end, an additional remote evaporator can be installed in either compartment to supply cooled air to additional storage areas in a closed fluid circuit. Additional supply air outlets, return air intakes, supply air hatches or return air hatches can also be included in either compartment to vary the air flow therein.

Figure 13:
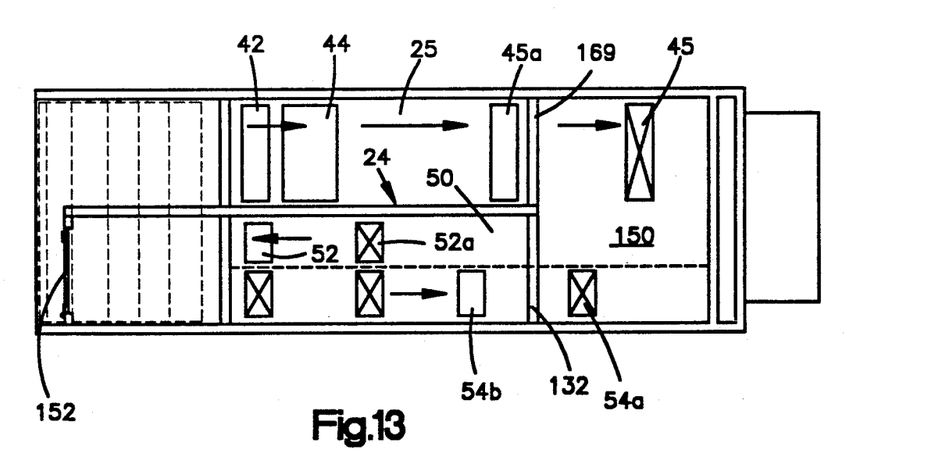
FIG. 13 is a top plan view of the refrigerated vehicle of FIG. 1, illustrating the refrigerated, frozen and third temperature compartments.

For example, as shown in FIG. 13, a plurality of selectively controllable supply air hatches 52, 52a can be included in the first half 50 of the frozen compartment. If a bulkhead is placed forwardly of hatch 52, then hatch 52 can be closed and hatch 52a can be opened. Additionally, to vary the dimensions of the refrigerated compartment, a lateral bulkhead, for example as shown at 169, can be installed towards the front of the refrigerated compartment, and an additional supply air outlet 45a can be provided in the suspended ceiling. Accordingly, an additional storage area is created as an extension of storage area 150. This enlarged storage area provides for the storage and transportation of goods stored at a third temperature. Opening 45 can include a conventional hatch to vary the air flow within this third storage area.

In yet an additional embodiment, the air flow within the refrigerated compartment in FIG. 2 can be reversed. In other words, the refrigerated compartment can be adapted to provide an air flow upward through the opening 45, rearward through the first plenum 46 (FIG. 3) to the remote evaporator 44, and downward through the opening 42. In this embodiment, the remote evaporator 44 can be mounted substantially adjacent to the opening 45 and is adapted to provide cooled air rearward to opening 42. Other variations in design of the vehicle body interior using additional partition panels and lateral bulkheads is also anticipated and is within the scope of this invention.

The principles, preferred embodiments, and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the present invention. Accordingly, the foregoing detailed description should be exemplary in nature and not as limiting to the scope and spirit of the invention as set forth in the appended claims.

What is claimed is:

1. An apparatus, comprising:
    a vehicle body having a longitudinally extending interior cavity including a front end, a rear end, and two sides extending longitudinally between the front and rear ends,
    said interior cavity having a pair of longitudinally extending compartments,
    means for selectively varying the longitudinal extent of each of said pair of longitudinally extending compartments comprising at least two bulkheads adapted for attachment to said body, said bulkheads selectively varying the longitudinal extent of at least one compartment and creating a third compartment, wherein each of said three compartments is substantially thermally and fluidly insulated from the remainder of the compartments, and means for substantially separating each compartment from the other compartment,
    said rear end of said vehicle body having an opening designed to enable goods to be loaded directly into either of said pair of selectively variable longitudinally extending compartments and unloaded directly from either of said pair of selectively variable longitudinally extending compartments,
    a first closed fluid circuit adapted to provide fluid flow through one of the pair of longitudinally extending compartments to maintain such compartment substantially at a first controlled temperature, and
    a second closed fluid circuit, separate from said first closed fluid circuit, providing a fluid flow through the third compartment to maintain such compartment substantially at a second controlled temperature, different from said first control temperature.

2. An apparatus as in claim 1, wherein the first and second closed fluid circuits each include a separate coolant source maintained at a predetermined temperature, each of said first and second closed fluid circuits adapted to have an air flow in heat exchange relationship with a respective coolant source.

3. An apparatus as in claim 1, wherein the closed fluid circuits each include at least one air intake means and at least one air outlet means, said at least one air intake means or said at least one air outlet means having means to adjust the air flow through said air intake means or said air outlet means.

4. An apparatus as in claim 3, wherein at least one of said closed fluid circuits has at least one air intake means located forwardly of an air outlet means.

5. An apparatus as in claim 3, wherein at least one of said closed fluid circuits has an air intake means located rearwardly of an air outlet means.

6. An apparatus as in claim 4, wherein at least one of said closed fluid circuits has an air intake means located rearwardly of an air outlet means.

7. An apparatus as in claim 6, wherein said air intake means includes a plurality of air intakes located in longitudinally spaced relation along said one compartment, and wherein at least one of said air intakes is adapted to be selectively opened or closed to permit air flow therethrough depending on the longitudinal extent of said one compartment to provide said first closed fluid circuit.

8. An apparatus as in claim 7, wherein said air intake means and said air outlet means includes at least one air intake and at least one air outlet located in the other compartment.

9. An apparatus as in claim 1, wherein the vehicle body includes a suspended ceiling extending along the length of the vehicle body, said suspended ceiling including at least one air intake means and at least one air outlet means in each compartment, said at least one air intake means and air outlets means being adapted to be selectively opened or closed to permit air flow therethrough depending on the longitudinal extent of such compartment to provide said closed fluid circuits.

10. An apparatus as in claim 9, further comprising a refrigeration means mounted on the vehicle body, said refrigeration means adapted to cool the air flow in said first and second closed fluid circuits.

11. An apparatus as in claim 10, wherein said refrigeration means is in fluid contact with a remote evaporator, said remote evaporator being mounted within said suspended ceiling and including means for cooling the air in said second closed fluid circuit.

12. A refrigerated vehicle, comprising:
a cab and a vehicle body mounted on a vehicle chassis,
said vehicle body having a longitudinally extending interior cavity including a front end, a rear end, and two sides extending longitudinally between the front and rear ends,
said interior cavity having a pair of longitudinally extending compartments,
means for selectively varying the longitudinal extent of each of said pair of longitudinally extending compartments comprising at least two bulkheads adapted for attachment to said body, said bulkheads selectively varying the longitudinal extent of at least one compartment and creating a third compartment, wherein each of said three compartments is substantially thermally and fluidly insulated from the remainder of the compartments, and means for substantially separating each compartment from the other compartment,
said rear end of said vehicle body having an opening which allows goods to be loaded directly into and unloaded directly from either of said selectively variable longitudinally extending compartments,
a first closed fluid circuit providing fluid flow through one of the pair of longitudinally extending compartments to maintain such compartment substantially at a first controlled temperature, and
a second closed fluid circuit, separate from said first closed fluid circuit, providing a fluid flow through the third compartment to maintain such compartment substantially at a second controlled temperature, different from said first control temperature.

13. A vehicle body for transporting goods, comprising:
the vehicle body having a longitudinally extending interior cavity including a front end, a rear end, and two sides extending longitudinally between the front and rear ends,
a plurality of panels adapted to be removably attached to said vehicle body to partition the interior cavity of the vehicle body into a pair of longitudinally extending compartments,
at least one bulkhead adapted for removable attachment between the panels and one side of the vehicle body to selectively vary the longitudinal extent of one of said longitudinally extending compartments and to create a smaller compartment, said bulkhead and said panels thermally and fluidly insulating said smaller compartment from the remainder of the interior of the vehicle body, said smaller compartment being accessible through the rear of the vehicle body so as to enable goods to be loaded into and unloaded from said smaller compartment, and
a closed fluid circuit providing a fluid flow through said smaller compartment.

14. A vehicle body for transporting goods as in claim 13, wherein the interior cavity of the vehicle body includes a ceiling, a floor and a channel extending along one of said ceiling or said floor, said channel enabling the plurality panels and the bulkhead to be mounted substantially adjacent to one side of the vehicle body.

15. A refrigerated vehicle, comprising:
a cab and a body mounted on a vehicle chassis,
the vehicle body having an interior cavity, the interior cavity including a front end, a rear end, and two sides extending longitudinally between the front and rear ends,
a plurality of panels adapted to be removably attached to said vehicle body to partition the interior cavity of the vehicle body into a pair of longitudinally extending compartments,
at least one bulkhead adapted for attachment between the panels and one side of said vehicle body to selectively vary the longitudinal extent of one of said longitudinally extending compartments and create a smaller compartment, said bulkhead and said panel thermally and fluidly insulating said smaller compartment from the remainder of the interior of the vehicle body, said smaller compartment being accessible through the rear of the vehicle body so as to enable goods to be loaded into and unloaded from said smaller compartment, and
a closed fluid circuit providing a fluid flow through said smaller compartment to maintain such compartment at a first controlled temperature.

16. An apparatus comprising:
a vehicle body having a longitudinally extending interior cavity including a front end, a rear end and two sides extending longitudinally between the front and rear ends,
said interior cavity including a plurality of panels attached to the vehicle body to partition the interior cavity to a pair of longitudinally extending compartments, each compartment adapted to be accessible through the rear of the vehicle body so as to enable goods to be loaded directly into and unloaded from either of said pair of longitudinally extending compartments,
means for selectively varying the longitudinal extent of each pair of longitudinally extending compartments comprising a bulkhead which creates a smaller compartment in either of said pair of compartments, said smaller compartment being accessible through the rear of the vehicle body so as to enable goods to be loaded directly into and unloaded from said smaller compartment said bulkhead and said panels thermally and fluidly insulates said smaller compartment from the remainder of the compartments,
one of said compartments including a first closed fluid circuit for providing air flow through the first compartment at a first control temperature, and said smaller compartment including a second closed fluid circuit for providing air flow through the smaller compartment at a second control temperature, different from said first control temperature.

17. A method for transporting goods at two different temperatures comprising the steps of:
providing a vehicle having a body and a cab;
mounting a plurality of removable panels in the vehicle body to divide the body into a pair of longitudinally extending compartments, one compartment being thermally and fluidly separate from the other compartment;
mounting a bulkhead within one of said pair of longitudinally extending compartments to vary the longitudinal extent of the compartment, to create a third compartment, and to thermally and fluidly insulate the third compartment from the remainder of the vehicle;

providing access through the rear of the vehicle body to said third compartment so as to enable goods to be loaded and unloaded from said third compartment, providing a first closed circuit air flow through one compartment at a first controlled temperature;

providing a second closed circuit air flow through the third compartment at a second controlled temperature, different from said first temperature.

18. A vehicle body for transporting goods, comprising:

the vehicle body having a longitudinally extending interior cavity including a front end, a rear end, a two sides extending longitudinally between the front and rear ends, said interior cavity including a ceiling, a floor, a first channel extending longitudinally along the ceiling, and a second channel extending longitudinally along the floor, a plurality of panels adapted to be removably attached to said vehicle body between said channels in longitudinally extending, adjacent relation to each other to partition the interior cavity of the vehicle body into a pair of longitudinally extending compartments, each compartment adapted to be accessible through the rear of the vehicle body so as to enable goods to be loaded into and unloaded from either of said pair of longitudinally extending compartments, at least one bulkhead adapted for attachment to the vehicle body to selectively vary the longitudinal extent of one of said longitudinally extending compartments, said one compartment being thermally and fluidly insulated from the remainder of the interior of the vehicle body, and a closed fluid circuit adapted to provide a fluid flow through said one longitudinally extending compartment.

19. A vehicle body for transporting goods as in claim 18, wherein the perimeter of each plural panel includes a sealing structure, said sealing structure thermally and fluidly sealing a panel to an adjacent panel and to the ceiling of the interior.

20. A vehicle body for transporting goods as in claim 19, wherein said sealing structure includes a bottom portion adapted to be received in said floor channel, and a top portion adapted to be received in said ceiling channel.

21. A vehicle body for transporting goods, comprising:

the vehicle body having a longitudinally extending interior cavity including a front end, a rear end, and two sides extending longitudinally between the front and rear ends, a plurality of panels adapted to be removably attached to said vehicle body to partition the interior cavity of the vehicle body into a pair of longitudinally extending compartments, each compartment adapted to be accessible through the rear of the vehicle body so as to enable goods to be loaded into the unloaded from either of said pair of longitudinally extending compartments, a closed fluid circuit providing a fluid flow through one of said longitudinally extending compartments, said vehicle body further including at least two bulkheads adapted for attachment to said body, each of said bulkheads selectively varying the longitudinal extent of at least one longitudinally extending compartment, said bulkheads creating a third compartment said third compartment being accessible through the rear of the vehicle body so as to enable goods to be loaded directly into and unloaded from said third compartment, and wherein each of said three compartments is thermally and fluidly insulated from the remainder of the compartments, a second closed fluid circuit providing a fluid flow through said third compartment.

22. A vehicle body for transporting goods as in claim 21, wherein said plural panels are adapted to be removably attached in longitudinally extending, adjacent relation to each other.

23. A vehicle body for transporting goods as in claim 21, wherein said bulkhead includes securing means to selectively position the bulkhead in a compartment substantially perpendicular to the sides of the vehicle body.

24. A vehicle body for transporting goods as in claim 23, wherein said securing means includes cargo control hooks and cargo control tracks, said cargo control hooks being attached to said bulkhead and said cargo control tracks mounted along the sides of the interior of the vehicle and along said plural panels, said cargo control hooks selectively attachable and detachable from selected openings in said cargo control tracks to secure the bulkhead at selected locations within a compartment.

25. A vehicle body for transporting goods as in claim 21, further including means to maintain said compartments at separately controlled temperatures, one of said compartments being maintained at a first controlled temperature, and the other of said compartments being maintained at a second controlled temperature, different from said first temperature.

26. A vehicle body for transporting goods as in claim 21, wherein said vehicle body includes a door and said rear end includes an opening, said door mounted on the vehicle body to selectively provide access through said opening to both of the longitudinally extending compartments.

27. A vehicle body for transporting goods, comprising:

the vehicle body having a longitudinally extending interior cavity including a front end, a rear end, and two sides extending longitudinally between the front and rear ends, a plurality of panels adapted to be removably attached to said vehicle body to partition the interior cavity of the vehicle body into a pair of longitudinally extending compartments, at least one bulkhead adapted for removable attachment to the vehicle body to selectively vary the longitudinal extent of one of said longitudinally extending compartments and to create a third compartment, said third compartment being thermally and fluidly insulated from the remainder of the interior of the vehicle body and accessible through the rear of the vehicle body so as to enable goods to be loaded into and unloaded from said third compartment, each of said plural panels and said bulkheads having at least two substantially coplanar sidewalls defining an interior cavity, and thermal insulation disposed in said interior cavity, said insulated plural panels and said insulated bulkheads thermally and fluidly separating said pair of compartments, and a closed fluid circuit adapted to provide a fluid flow through said third compartment.

28. An apparatus, comprising:

a vehicle body having a longitudinally extending interior cavity including a front end, a rear end, and two sides extending longitudinally between the front and rear ends, said interior cavity having a pair of longitudinally extending compartments, means for selectively varying the longitudinal extent of each of said pair of longitudinally extending compartments and means for substantially separating each compartment from the other compartment, said rear end of said vehicle body having an opening designed to enable goods to be loaded directly into either of said pair of selectively variable longitudinally extending compartments and unloaded directly from either of said pair of selectively variable longitudinally extending compartments, a first closed fluid circuit adapted to provide fluid flow through one of the pair of longitudinally extending compartments to maintain such compartment substantially at a first controlled temperature, and a second closed fluid circuit, separate from said first closed fluid circuit, adapted to provide a fluid flow through the other of said pair of longitudinally extending compartments to maintain such compartment substantially at a second controlled temperature, different from said first control temperature, said vehicle body having a suspended ceiling extending along the length of the vehicle body, said suspended ceiling including a plurality of air intakes located in longitudinally spaced relation in at least one of said compartments and at least one air outlet in each compartment, said plurality of air intakes and said at least one air outlet being adapted to be selectively opened or closed to permit air flow therethrough depending on the longitudinal extent of said compartment to provide said closed fluid circuits.

29. An apparatus, comprising:

a vehicle body having a longitudinally extending interior cavity including a front end, a rear end, and two sides extending longitudinally between the front and rear ends, said interior cavity having a pair of longitudinally extending compartments, means for selectively varying the longitudinal extent of each of said pair of longitudinally extending compartments and means for substantially separating each compartment from the other compartment, said rear end of said vehicle body having an opening designed to enable goods to be loaded directly into either of said pair of selectively variable longitudinally extending compartments and unloaded directly from either of said pair of selectively variable longitudinally extending compartments, a first closed fluid circuit adapted to provide fluid flow through one of the pair of longitudinally extending compartments to maintain such compartment substantially at a first controlled temperature, and a second closed fluid circuit, separate from said first closed fluid circuit, adapted to provide a fluid flow through the other of said pair of longitudinally extending compartments to maintain such compartment substantially at a second controlled temperature, different from said first control temperature, said vehicle body having a suspended ceiling extending along the length of the vehicle body, said suspended ceiling including at least one air intake and a plurality of air outlets located in longitudinally spaced relation along at least one of said compartments, said at least one air intake and said plurality of air outlets being adapted to be selectively opened or closed to permit air flow therethrough depending on the longitudinal extent of such compartment to provide said closed fluid circuits.

30. A refrigerated vehicle, comprising:

a cab and a body mounted on a vehicle chassis, said vehicle body having an interior cavity, the interior cavity including a front end, a rear end, a two sides extending longitudinally between the front and rear ends, said interior cavity including a ceiling, a floor, a first channel extending longitudinally along the ceiling, and a second channel extending longitudinally along the floor, a plurality of panels adapted to be removably attached to said vehicle body between said channels in longitudinally extending, adjacent relation to each other to partition the interior cavity of the vehicle body into a pair of longitudinally extending compartments, each compartment adapted to be accessible through the rear of the vehicle body so as to enable goods to be loaded into and unloaded from either of said pair of longitudinally extending compartments, at least one bulkhead adapted for attachment to the vehicle body to selectively vary the longitudinal extent of one of said longitudinally extending compartments, said one compartment being thermally and fluidly insulted from the remainder of the interior of the vehicle body, and a closed fluid circuit adapted to provide a fluid flow through said one longitudinally extending compartment.

31. A refrigerated vehicle, comprising:

a cab and a body mounted on a chassis, the vehicle body having an interior cavity including a front end, a rear end, and two sides extending longitudinally between the front and rear ends, a plurality of panels adapted to be removably attached to said vehicle body to partition the interior cavity of the vehicle body into a pair of longitudinally extending compartments, each compartment adapted to be accessible through the rear of the vehicle body so as to enable goods to be loaded into and unloaded from either of said pair of longitudinally extending compartments, a closed fluid circuit adapted to provide a fluid flow through said one longitudinally extending compartments, said vehicle body further including at least two bulkheads adapted for attachment to said body, search of said bulkheads selectively varying the longitudinal extent of at least one longitudinally extending compartment, said bulkheads creating a third compartment, and wherein each of said three compartments is thermally and fluidly insulated from the remainder of the compartments.

32. A refrigerated vehicle, comprising:

a cab and a body mounted on a vehicle chassis, the vehicle body having a longitudinally extending interior cavity including a front end, a rear end, and two sides extending longitudinally between the front and rear ends, a plurality of panels adapted to be removably attached to said vehicle body to partition the interior cavity of the vehicle body into a pair of longitudinally extending compartments, at least one bulkhead adapted for removable attachment to the vehicle body to selectively vary the longitudinal extent of one of said longitudinally extending and to create a third compartment, said third compartment being thermally and fluidly insulated from the remainder of the interior of the vehicle body and accessible through the rear of the vehicle body so as to enable goods to be loaded into the unloaded from said third compartment, each of said plural panels and said bulkheads having at least two substantially coplanar sidewalls defining an interior cavity, and thermal insulation disposed in said interior cavity, said insulated plural panels and said insulated bulkheads thermally and fluidly separating said pair of compartments, and a closed fluid circuit adapted to provide a fluid flow through said one third compartment.

33. A refrigerated vehicle, comprising:

a cab and a vehicle body having a longitudinally extending interior cavity including a front end, a rear end, and two sides extending longitudinally between the front and rear ends, said interior cavity having a pair of longitudinally extending compartments, means for selectively varying the longitudinal extent of each of said pair of longitudinally extending compartments and means for substantially separating each compartment from the other compartment, said rear end of said vehicle body having an opening designed to enable goods to be loaded directly into either of said pair of selectively variable longitudinally extending compartments and unloaded directly from either of said pair of selectively variable longitudinally extending compartments, a first closed fluid circuit adapted to provide fluid flow through one of the pair of longitudinally extending compartments to maintain such compartment substantially at a first controlled temperature, and a second closed fluid circuit, separate from said first closed fluid circuit, providing a fluid flow through the other of said pair of longitudinally extending compartments to maintain such compartment substantially at a second controlled temperature, different from said first control temperature, said vehicle body having a suspended ceiling extending along the length of the vehicle body, said suspended ceiling including a plurality of air intakes located in longitudinally spaced relation in at least one of said compartments and at least one air outlet in each compartment, said plurality of air intake and said at least one air outlet being adapted to be selectively opened or closed to permit air flow therethrough depending on the longitudinal extent of such compartment to provide said closed fluid circuits.

34. A refrigerated vehicle, comprising:

a cab ad a vehicle body mounted on a chassis, the vehicle body having a longitudinally extending interior cavity including a front end, a rear end, and two sides extending longitudinally between the front and rear ends, said interior cavity having a pair of longitudinally extending compartments, means for selectively varying the longitudinal extent of each of said pair of longitudinally extending compartments and means for substantially separating each compartment from the other compartment, said rear end of said vehicle body having an opening designed to enable goods to be loaded directly into either of said pair of selectively variable longitudinally extending compartments and unloaded directly from either of said pair of selectively variable longitudinally extending compartments, a first closed fluid circuit adapted to provide fluid flow through one of the pair of longitudinally extending compartments to maintain such compartment substantially at a first controlled temperature, and a second closed fluid circuit, separate from said first closed fluid circuit, adapted to provide a fluid flow through the other of said pair of longitudinally extending compartments to maintain such compartment substantially at a second controlled temperature, different from said first control temperature, said vehicle body having a suspended ceiling extending along the length of the vehicle body, said suspended ceiling including at leas one air intake and a plurality of air outlets located in longitudinally spaced relation along at least one of said compartments, said at least one air intake and said plurality of air outlets being adapted to be selectively opened or closed to permit air flow therethrough depending on the longitudinal extent of such compartment to provide said closed fluid circuits.

* * * * *

UNITED STATES PATENT AND TRADEMARK OFFICE
CERTIFICATE OF CORRECTION

PATENT NO. : 5,161,848

DATED : November 10, 1992

INVENTOR(S) : Theodore A. Lutton

It is certified that error appears in the above-identified patent and that said Letters Patent is hereby corrected as shown below:

Column 13, line 67 change "the plurality panels" to --the plural panels--;

Column 14, line 45 change "said smaller compartment said" to --said smaller compartment, said--;

Column 15, line 15 change "a rear end, a" to --a rear end, and--;

Column 15, line 62 change "into the unloaded from" to --into and unloaded from--;

Column 16, lines 2 and 3 change "third compartment said third compartment" to --third compartment, said third compartment--;

Column 18, line 60 change "said body, search" to --said body, each--;

Column 19, line 25 change "fluid circuit adapted to provide a fluid flow" to --fluid circuit providing a fluid flow--;

Column 19, line 28 change "vehicle body having a longitudinally" to --vehicle body mounted on a chassis, the vehicle body having a longitudinally--;

Column 20, line 46 change "including at leas one air intake" to --including at least one air intake--;

UNITED STATES PATENT AND TRADEMARK OFFICE
CERTIFICATE OF CORRECTION

PATENT NO. : 5,161,848

DATED : November 10, 1992

INVENTOR(S) : Theodore A. Lutton

It is certified that error appears in the above-indentified patent and that said Letters Patent is hereby corrected as shown below:

Column 20, line 14, change "a cab ad a vehicle" to --a cab and a vehicle--.

Signed and Sealed this

Sixteenth Day of November, 1993

Attest:

BRUCE LEHMAN

*Attesting Officer*  *Commissioner of Patents and Trademarks*